United States Patent
Masiewicz

(10) Patent No.: US 7,673,075 B1
(45) Date of Patent: Mar. 2, 2010

(54) PASS-THROUGH INFORMATION TRANSFERS IN SERIAL COMMUNICATIONS BETWEEN A DEVICE AND A HOST

(75) Inventor: John C. Masiewicz, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 294 days.

(21) Appl. No.: 11/131,036

(22) Filed: May 17, 2005

(51) Int. Cl.
G06F 3/00 (2006.01)
G06F 13/28 (2006.01)

(52) U.S. Cl. .......................................... 710/2; 710/22
(58) Field of Classification Search .................. 710/22, 710/105, 2; 711/151, 114
See application file for complete search history.

(56) References Cited

U.S. PATENT DOCUMENTS

| | | | |
|---|---|---|---|
| 7,130,932 B1 * | 10/2006 | Ghaffari | 710/22 |
| 7,404,013 B1 | 7/2008 | Masiewicz | |
| 2003/0131125 A1 * | 7/2003 | Ooi | 709/237 |
| 2003/0221061 A1 * | 11/2003 | El-Batal et al. | 711/114 |
| 2003/0236952 A1 * | 12/2003 | Grieff et al. | 711/151 |
| 2003/0236953 A1 * | 12/2003 | Grieff et al. | 711/151 |
| 2004/0019718 A1 * | 1/2004 | Schauer et al. | 710/105 |
| 2005/0086413 A1 | 4/2005 | Lee et al. | |

OTHER PUBLICATIONS

John Masiewicz, "AT Attachment with Packet Interface—7 vol. 3—Serial Transport Protocols and Physical Interconnect", Working Draft American National Standard for Information Technology, T13 Project 1532D, Revision 4b, Apr. 21, 2004, pp. i-282.
Robert C. Elliott, "Serial Attached SCSI (SAS)", Working Draft American National Standard for Information Technology, Project T10/1562-D, Revision 5, Jul. 9, 2003, pp. i-432.
Office Action dated Oct. 12, 2007 from U.S. Appl. No. 11/130,944 (21 pages).
American National Standard for Information Technology, AT Attachment with Packet Interface—7 vol. 3 Serial Transport Protocols and Physical Interconnect (ATAIATAPI-7 V3), Apr. 21, 2004, pp. 19, 23, 35, 59-60, 121-122, 126-127, 132.
Notice of Allowance dated Mar. 17, 2008 from U.S. Appl. No. 11/130,944.

* cited by examiner

*Primary Examiner*—Henry W. H. Tsai
*Assistant Examiner*—Titus Wong
(74) *Attorney, Agent, or Firm*—Blakely, Sokoloff, Taylor & Zafman

(57) ABSTRACT

A device communicatively coupled to a host in a Serial Advanced Technology Attachment (SATA) format. The device includes a processor to control operations in the device and a serial interface to control serial communication in accordance with the SATA format with the host. The serial interface during the transmission of primitives in a pass-through phase, inserts pass-through information to the host within or outside of a Frame Information Structure (FIS). If the host is not pass-through enabled, the host ignores the pass-through information. However, if the host is pass-through enabled, the host recognizes the pass-through information.

25 Claims, 15 Drawing Sheets

| HOST STATE | HOST DRIVER | BUS STATE | DEVICE DRIVER | DEVICE STATE | DESCRIPTION |
|---|---|---|---|---|---|
| L1 | SYNC | IDLE | SYNC | L1 | IDLE CONDITION |
| LMT1 | SYNC | IDLE | SYNC | L1 | TRANSPORT REQUEST MSG XMIT |
| LMT1 | SOM | MESSAGE | SYNC | LR2 | HOST STARTS MESSAGE WHILE IDLE |
| LMT1 | MESSAGE | MESSAGE | SYNC | LMR1 | MESSAGE DATA WORD |
| LMT1 | ... | MESSAGE | SYNC | LMR1 | CONTINUE MESSAGE DATA WORDS |
| LMT1 | MESSAGE | MESSAGE | SYNC | LMR1 | LAST MESSAGE DATA WORD |
| LMT1 | MSG CRC | MESSAGE | SYNC | LMR1 | MESSAGE CRC WORD(S) |
| LMT1 | EOM | MESSAGE | SYNC | LMR1 | HOST INDICATES END OF MESSAGE |
| L1 | SYNC | IDLE | SYNC | L1 | HOST RESUMES SYNC |
| LT1 | X_RDY | BEGIN FIS | SYNC | LR1 | HOST STARTS FIS TRANSFER |
| LT1 OR LMT2 | X_RDY | BEGIN FIS | SYNC | LR1 | HOST WAITS FOR DEVICE RECEIVE READY. TRANSPORT REQ MSG XMIT |
| LMT2 | SOM | MESSAGE | SYNC OR R_RDY | LMR1 | HOST STARTS MESSAGE WHILE X_RDY |
| LMT2 | MESSAGE | MESSAGE | SYNC OR R_RDY | LMR1 | MESSAGE DATA WORD |
| LMT2 | ... | MESSAGE | SYNC OR R_RDY | LMR1 | CONTINUE MESSAGE DATA WORDS |
| LMT2 | MESSAGE | MESSAGE | SYNC OR R_RDY | LMR1 | LAST MESSAGE DATA WORD |
| LMT2 | MSG CRC | MESSAGE | SYNC OR R_RDY | LMR1 | MESSAGE CRC WORD(S) |
| LMT2 | EOM | MESSAGE | SYNC OR R_RDY | LMR1 | HOST INDICATES END OF MESSAGE |
| LT1 | X_RDY | BEGIN FIS | SYNC OR R_RDY | LR1 | HOST RESUMES X_RDY |
| LT1 | X_RDY | BEGIN FIS | R_RDY | LR1 | DEVICE INDICATES READY TO RECEIVE |
| LT1 | X_RDY | BEGIN FIS | R_RDY | LR1 | HOST DECODES R_RDY |
| LT3 | SOF | START FIS | R_RDY | LR3 | HOST STARTS FIS WITH START OF FRAME |

FIG. 8A

| | | | | |
|---|---|---|---|---|
| LT4 | DWORD 1 | FIS PAYLOAD | R_RDY | LR3 | HOST FIS DATA, DEVICE DECODES SOF |
| LT4 | DWORD 2 | FIS PAYLOAD | R_IP | LR3 | HOST CONTINUES SENDING FIS DATA |
| LT4 | ... | ... | ... | LR3 | |
| LT4 | DWORD N | FIS PAYLOAD | R_IP | LR3 | HOST SENDS LAST DATA WORD |
| LT7 | CRC | FIS CHECK | R_IP | LR3 | HOST SENDS CRC |
| LT8 | EOF | END OF FIS | R_IP | LR6 | HOST SENDS END OF FRAME |
| LT9 | WTRM | WAIT FOR ACK | R_IP | LR6 | DEVICE DECODES EOF |
| LT9 | WTRM | WAIT FOR ACK | R_IP | LR7 OR LR8 | DEVICE WAITS FOR IDLE |
| LMT3 | SOM | MESSAGE | R_IP OR R_OK | LR7 OR LR8 | HOST STARTS MESSAGE WHILE WTRM |
| LMT3 | MESSAGE | MESSAGE | R_IP OR R_OK | LR7 OR LR8 | MESSAGE DATA WORD |
| LMT3 | ... | MESSAGE | R_IP OR R_OK | LR7 OR LR8 | CONTINUE MESSAGE DATA WORDS |
| LMT3 | MESSAGE | MESSAGE | R_IP OR R_OK | LR7 OR LR8 | LAST MESSAGE DATA WORD |
| LMT3 | MSG CRC | MESSAGE | R_IP OR R_OK | LR7 OR LR8 | MESSAGE CRC WORD(S) |
| LMT3 | EOM | MESSAGE | R_IP OR R_OK | LR7 OR LR8 | HOST INDICATES END OF MESSAGE |
| LT9 | WTRM | WAIT FOR ACK | R_IP OR R_OK | LR7 OR LR8 | HOST RESUMES WTRM |
| LT9 | WTRM | ACK | R_OK | LR8 | DEVICE SENDS GOOD END |
| LT9 | WTRM | ACK | R_OK | LR8 | HOST DECODES R_OK AS GOOD RESULTS |
| L1 | SYNC | HOST IDLE | R_OK | LR8 | HOST RELEASES INTERFACE |
| L1 | SYNC | HOST IDLE | R_OK | LR8 | DEVICE DECODES RELEASE BY |
| L1 | SYNC | DEVICE IDLE | SYNC | L1 | HOST - IS ALLOWED TO RELEASE IDLE CONDITION |

FIG. 8B

| HOST STATE | HOST DRIVER | BUS STATE | DEVICE DRIVER | DEVICE STATE | DESCRIPTION |
|---|---|---|---|---|---|
| L1 | SYNC | IDLE | SYNC | L1 | IDLE CONDITION |
| LMT1 | SYNC | IDLE | SYNC | L1 | TRANSPORT REQUEST MSG XMIT |
| LMH1 | SOM | HOST TO DEVICE MESSAGE | SYNC | LR1 TO LMR1 | HOST STARTS MESSAGE WHILE IDLE DEVICE IDENTIFIES MESSAGE AS NEEDING RESPONSE AND GOES INTO HALF-DUPLEX STATE. |
| LMH1 | MESSAGE | MESSAGE | SYNC | LMDR1 | HOST MESSAGE DATA WORD |
| LMH1 | ... | MESSAGE | SYNC | LMDR1 | CONTINUE HOST MESSAGE DATA WORDS |
| LMH1 | MESSAGE | MESSAGE | SYNC | LMDR1 | LAST HOST MESSAGE DATA WORD |
| LMH2 | MSG CRC | MESSAGE | SYNC | LMDR2 | HOST MESSAGE CRC WORD(S) |
| LMH2 | EOM | MESSAGE | SYNC | LMDT1 | HOST INDICATES END OF MESSAGE |
| LMH3 | SYNC | IDLE | SYNC | L1 | HOST RESUMES SYNC |
| LMH3 | SYNC | IDLE | SYNC | L1 | IDLE CONDITION |
| LMH3 | SYNC | IDLE | SYNC | L1 | TRANSPORT REQUEST MSG XMIT |
| LMH4 | SYNC | HOST TO DEVICE MESSAGE | SOM | LMT1 | DEVICE STARTS MESSAGE WHILE IDLE |
| LMH4 | SYNC | MESSAGE | MESSAGE | LMT1 | DEVICE MESSAGE DATA WORD |
| LMH4 | SYNC | MESSAGE | ... | LMT1 | CONTINUE MESSAGE DATA WORDS |
| LMH4 | SYNC | MESSAGE | MESSAGE | LMT1 | LAST MESSAGE DATA WORD |
| LMH4 | SYNC | MESSAGE | MSG CRC | LMT1 | MESSAGE CRC WORD(S) |
| LMH4 | SYNC | MESSAGE | EOM | LMT1 | DEVICE INDICATES END OF MESSAGE |
| L1 | SYNC | IDLE | SYNC | L1 | DEVICE RESUMES SYNC |
| L1 | SYNC | IDLE | SYNC | L1 | HOST/DEVICE IDLE |
| L1 | SYNC | IDLE | SYNC | L1 | HOST/DEVICE IDLE |

FIG. 11

| HOST STATE | HOST DRIVER | BUS STATE | DEVICE DRIVER | DEVICE STATE | DESCRIPTION |
|---|---|---|---|---|---|
| L1 | SYNC | IDLE | SYNC | L1 | IDLE CONDITION |
| LMT1 | SYNC | IDLE | SYNC | L1 | TRANSPORT REQUEST MSG XMIT |
| LMT1 | SOM | MESSAGE | SYNC | L1 | HOST STARTS MESSAGE WHILE IDLE |
| LMT1 | MESSAGE | MESSAGE | SYNC | L1 | MESSAGE DATA WORD FROM HOST |
| LMT1 | ... | MESSAGE | SOM | LR2 | MESSAGE DATA WORD FROM HOST DEVICE STARTS MESSAGE WHILE IDLE |
| LMT1 | MESSAGE | MESSAGE | MESSAGE | LMR1 | MESSAGE DATA WORD FROM HOST MESSAGE DATA WORD FORM DEVICE |
| LMT1 | ... | MESSAGE | ... | LMR1 | HOST AND DEVICE CONTINUE MESSAGE DATA WORDS |
| | MSG CRC | | | | HOST SENDS MESSAGE CRC WORD(S) DEVICE STILL SENDING MESSAGE |
| LMT1 | EOM | MESSAGE | MESSAGE | LMR1 | HOST INDICATES END OF MESSAGE DEVICE CONTINUES SENDING DATA WORDS |
| L1 | SYNC | IDLE | MSG CRC | LMR1 | HOST IS BUS IDLE DEVICE SENDS MESSAGE CRC WORD(S) |
| L1 | SYNC | IDLE | EOM | LMR1 | HOST IS BUS IDLE DEVICE INDICATES END OF MESSAGE |
| L1 | SYNC | IDLE | SYNC | L1 | HOST AND DEVICE ARE IDLE |
| | | | SYNC | L1 | HOST RESUMES SYNC |
| | | | SYNC | L1 | IDLE CONDITION |

FIG. 16

PASS-THROUGH INFORMATION TRANSFERS IN SERIAL COMMUNICATIONS BETWEEN A DEVICE AND A HOST

BACKGROUND OF THE INVENTION

This application is related to: Ser. No. 11/130,944, filed on May 17, 2005, for inventor, John C. Masiewicz, and assigned to Western Digital Technologies, Inc., which is hereby incorporated by reference.

FIELD OF THE INVENTION

The present invention relates to pass-through information transfers in serial communications between a device and a host. More particularly, the present invention relates to serial communication in accordance with a Serial Advanced Technology Attachment (SATA) format in which pass-through information may be inserted into information transfers that is recognized by enabled devices and ignored by non-enabled devices.

DESCRIPTION OF THE PREFERRED EMBODIMENTS AND RELATED INFORMATION

Today, computing devices, such as computers, are routinely used both at work and in the home. Computing devices advantageously enable file sharing, the creation of electronic documents, the use of application specific software, and access to information and electronic commerce through the Internet and other computer networks.

Typically, a host computer is connected to another device, such as a storage peripheral (e.g. a hard disk drive). Storage devices and other types of devices are typically connected to a host computer through a host interface connector for the transfer of commands, status and data. For example, a host computer may access a disk drive device and read data from the disk drive and/or save data to the disk drive.

The host computer is typically connected to a device, such as a disk drive, through a cable connection or a printed circuit board (PCB) connection. This connection is generally termed an "interconnect". For compatibility, the connectors, cables, and interface protocol are typically standardized. Accordingly, the interfaces of both the device and the host need to comply with the same interface standard.

In the past, a host computer was typically connected to an external storage device, such as a hard disk drive, by a parallel interface. The most common parallel interface is the Parallel Advanced Technology Attachment/Integrated Drive Electronics (PATA/IDE) interface.

Today, storage devices, host computers, and other devices, are being designed to comply with newer faster standards that operate in a serial fashion. Examples of these newer serial standards include the Serial Advanced Technology Attachment (SATA) standard and the Serial Attached SCSI (SAS) standard. Both the SATA and SAS standards define various related specifications for SATA and SAS compliant connectors and cables, along with various interface protocols for SATA and SAS devices, respectively.

The serial interface defined by the related SATA and SAS protocols relates to the transfer of commands, data, and status via frame information structures (FISs). Unfortunately, the related SATA and SAS protocols do not allow for extensions to the protocol to provide enhancements without introducing significant compatibility issues with prior devices.

SUMMARY OF THE INVENTION

The present invention relates to pass-through information transfers in serial communications between a device and a host. More particularly, the present invention relates to serial communication in accordance with a SATA format in which pass-through information may be inserted that is recognized by enabled devices and ignored by non-enabled devices.

In one aspect, the invention may be regarded as a device communicatively coupled to a host in a Serial Advanced Technology Attachment (SATA) format. The device includes a processor to control operations in the device and a serial interface to control serial communication in accordance with the SATA format with the host. The serial interface during the transmission of primitives in a pass-through phase, inserts pass-through information to the host within or outside of a Frame Information Structure (FIS). If the host is not pass-through enabled, the host ignores the pass-through information. However, if the host is pass-through enabled, the host recognizes the pass-through information.

In one embodiment, primitives include repeated primitives. Further, the primitives may include primitives that are shared primitives common to both the device and the host. The pass-through information may include at least one of a message, data, status, or a command. The inserting of pass-through information between the device and the host typically occurs at the link layer.

In one embodiment, the pass-through phase includes an idle (SYNC) phase. The pass-through phase may include at least one of a transmit ready (X_RDY) phase, a wait for termination (WTRM) phase, a receipt in progress (R_IP) phase, a receipt OK (R_OK) phase, or a receive with error (R_ERR) phase. In one embodiment, the transmission of the pass-through information between the device and the host occurs in a simplex mode. In another embodiment, the transmission of the pass-through information between the device and the host occurs in a half-duplex mode. In yet another embodiment, the transmission of pass-through information between the device and the host occurs in a full duplex mode.

In another aspect, the invention may be regarded as a disk drive communicatively coupled to a host in a Serial Advanced Technology Attachment (SATA) format. The disk drive includes a disk to store data, a head to read and write data from and to the disk, respectively, a processor to control operations in the disk drive, and a serial interface to control serial communication in accordance with the SATA format with the host. Particularly, during the transmission of primitives in a pass-through phase, the serial interface inserts pass-through information to the host within or outside of a Frame Information Structure (FIS). If the host is not pass-through enabled, the host ignores the pass-through information.

In yet another aspect, the invention may be regarded as a host communicatively coupled to a device in a Serial Advanced Technology Attachment (SATA) format. The host comprises a processor to control operations in the host and a serial interface to control serial communication in accordance with the SATA format with the device. Particularly, during transmission of primitives in a pass-through phase, the serial interface inserts pass-through information to the device within or outside of a Frame Information Structure (FIS). If the device is not pass-through enabled, the device ignores the pass-through information. However, if the device is pass-through enabled, the device recognizes the pass-through information.

The foregoing and other features are described in detail below and are set forth in the pending claims.

BRIEF DESCRIPTION OF THE DRAWINGS

FIG. 6 is a block diagram illustrating an example of functionality to implement the insertion of pass-through.

FIG. 8 is a table listing a variety of different state transitions that are tabulated with MIS bus states and message primitives, above and beyond what is utilized in the standard SATA format.

FIG. 11 is a table illustrating examples of half-duplex messages.

FIG. 16 is a table illustrating examples of full duplex messages.

DETAILED DESCRIPTION

Figure 1:
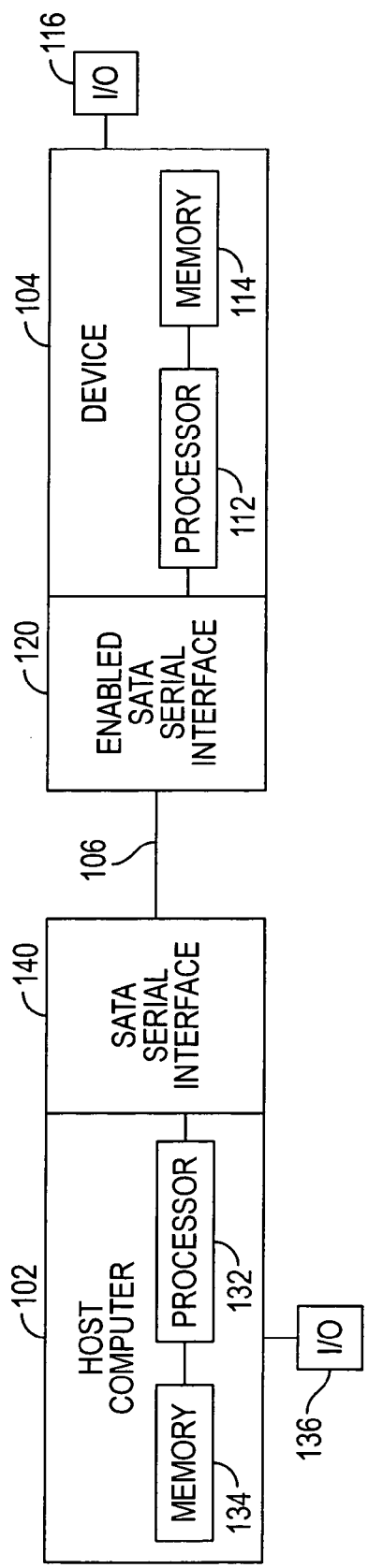
FIG. 1 is a block diagram illustrating a device having an enabled SATA serial interface coupled to a host computer having a standard SATA serial interface.

The present invention relates to pass-through information transfers in serial communications between a device and a host. More particularly, the present invention relates to serial communication in accordance with a SATA format in which the pass-through information may be inserted that is recognized by an enabled devices and ignored by non-enabled devices.

The Serial Attached Technology Attachment (SATA) interface transfers commands, data, and status via Frame Information Structures (FISs). In addition, the SATA interface utilizes primitives to provide interface management and power management. Embodiments of the invention relate to techniques for transferring additional information (e.g. command, data, status, messages, etc.) on the SATA interface outside an FIS by either not using primitives, or by using newly defined primitives; and does so in such a way as to allow existing SATA protocol to function as is currently defined and, at the same time, maintains compatibility with existing SATA implementations. In addition, techniques may be employed to transfer information within the FIS on a back-channel.

The information transmitted as pass-through information may be contained within a Message Information Structure (MIS) and may be received by a device enabled to recognize such MISs, but is ignored by SATA devices not enabled to recognize the MIS. Thus, techniques are provided to transfer pass-through information across the SATA interface that can be targeted to specific receivers, or formatted in a manner to transfer pass-through information that only enabled receivers will be able to interpret. This pass-through information can contain identifying fields for the sender or recipient, payload data, data ID, tags, security information, request or acknowledgement protocols, retry requests, configuration information, device or enclosure management protocols, power management protocols, or other information that the system may require.

It is also possible for a sender or recipient to have specific protocols known only to that sender and recipient, but ignored by other devices, even if enabled. Moreover, embodiments of the invention take advantage of otherwise unused interface bandwidth, allows for simplex, half duplex, or full duplex communication, wherein data can be transferred in both directions on the SATA interface simultaneously, and allows for existing peripheral devices such as expanders, routers, and multiplexers to operate in such a system without changes. The AT Attachment with Packet Interface, Serial Transport Protocols and Physical Interconnect (ATA-ATAP1-7V3), as set forth by the American National Standard for Information Technology Standard is hereby incorporated by reference, and will be referred to herein as the SATA format. Additionally, it will be appreciated that embodiments of the invention may be utilized with the Serial Attached SCSI (SAS) (T10-1562-D) standard [hereinafter referred to as the SAS format], which is also hereby incorporated by reference.

In explaining embodiments of the invention, in order to differentiate message information from existing frame information structures (FISs) to transfer payloads, the term message information structure (MIS) will be used and the payload of an MIS will be referred to as pass-through information.

With reference to FIG. 1, FIG. 1 is a block diagram illustrating a device 104 having an enabled SATA serial interface coupled to a host computer having a standard SATA serial interface. Particularly, device 104 is communicatively coupled through an interconnect 106 to a host computer 102 in a SATA format. The device 104 includes a processor 112 to control operations in the device 104 and an enabled SATA serial interface 120 to control serial communication with the host computer 102 in accordance with the SATA format. Further, device 104 may include memory 114 coupled to processor 112 as well as a plurality of different input/output (I/O) devices 116.

In one embodiment, and as will be discussed in more detail later, the enabled SATA serial interface 120 during the transmission of repeated primitives in a pass-through phase, may insert pass-through information to the host computer 102 within or outside of a frame information structure (FIS). The host computer 102 may or may not be pass-through enabled.

As shown in FIG. 1, the host computer 102 includes a processor 132 to control operations in the host computer and a memory 134 coupled thereto, as well as various input/output devices (I/O) devices 136, and is not pass-through enabled. In this instance, the host computer 102 has a standard SATA serial interface 140. Particularly, because the host is not pass-through enabled, the host ignores pass-through information received from device 104.

Figure 2:
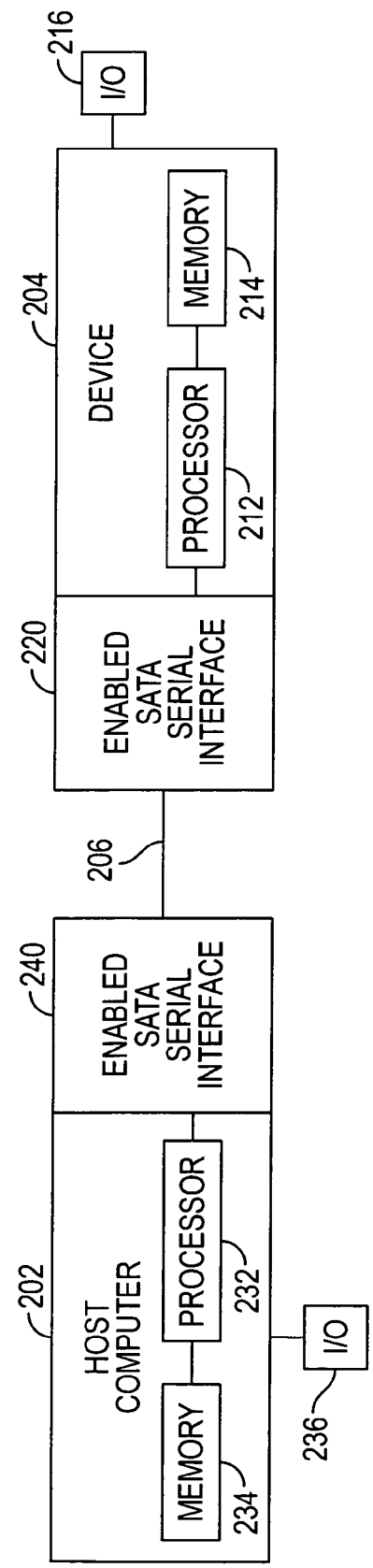
FIG. 2 is a block diagram illustrating a pass-through enabled device and a pass-through enabled host computer.

Turning now to FIG. 2, FIG. 2 is a block diagram illustrating a pass-through enabled device 204 and a pass-through enabled host computer 202. Again, device 204 includes a processor 212 to control operations in the device 204 along with a memory 214 and various I/O devices 216. Further, device 204 includes an enabled SATA serial interface 220 that through interconnect 206 is connected to a host computer 202. The host computer 202 includes a processor 232 to control operations in the host computer, as well as a memory 234, and various I/O devices 236. Further, in this instance, the host computer 202 includes an enabled SATA serial interface 240 for the receipt of serial communication from device 204, and particularly recognizes pass-through information from device 204.

In this instance, because the host computer 202 is pass-through enabled by having enabled SATA serial interface 240, the host computer 202 recognizes the pass-through information transmitted by device 204. It should be appreciated that in this example both enabled host computer 202 and enabled host device 204 can transmit pass-through information to one another.

In one embodiment, pass-through information may be transmitted by the device or host during transmission of a repeated primitive in a pass-through phase within a message information structure (MIS) that includes the pass-through information. The MIS transmitted by the device or the host may include a start of message (SOM) primitive sequence to indicate a beginning of the pass-through information to be transmitted and an end of message (EOM) primitive sequence to indicate that the pass-through information has been transmitted. In one embodiment, the primitives may include unique primitives that are shared primitives common to both the device and the host. The pass-through information may include message, data, status, and/or command information.

It should be appreciated that these are very simplified examples of hosts 102, 202 and devices 104, 204, in which embodiments of the invention may be practiced. Various types of hosts or devices such as personal computers, laptop computers, network computers, set-top boxes, servers, routers, expanders, RAIDs, mainframes, enterprise environments, etc., or any type of computing device or system having a processor and/or memory may be utilized with embodiments of the invention.

Additionally, an example of a device such as a hard disk drive 300 will now be illustrated as one type of storage device in which embodiments of the invention may be practiced. However, it should be appreciated that, the embodiments to be hereinafter described may be utilized for a wide variety of different types of storage devices (e.g., CD-ROM, DVD, floppy drive, flash memory, micro-drives, etc.) or any type of device that interconnects and communicates to a host.

Figure 3:
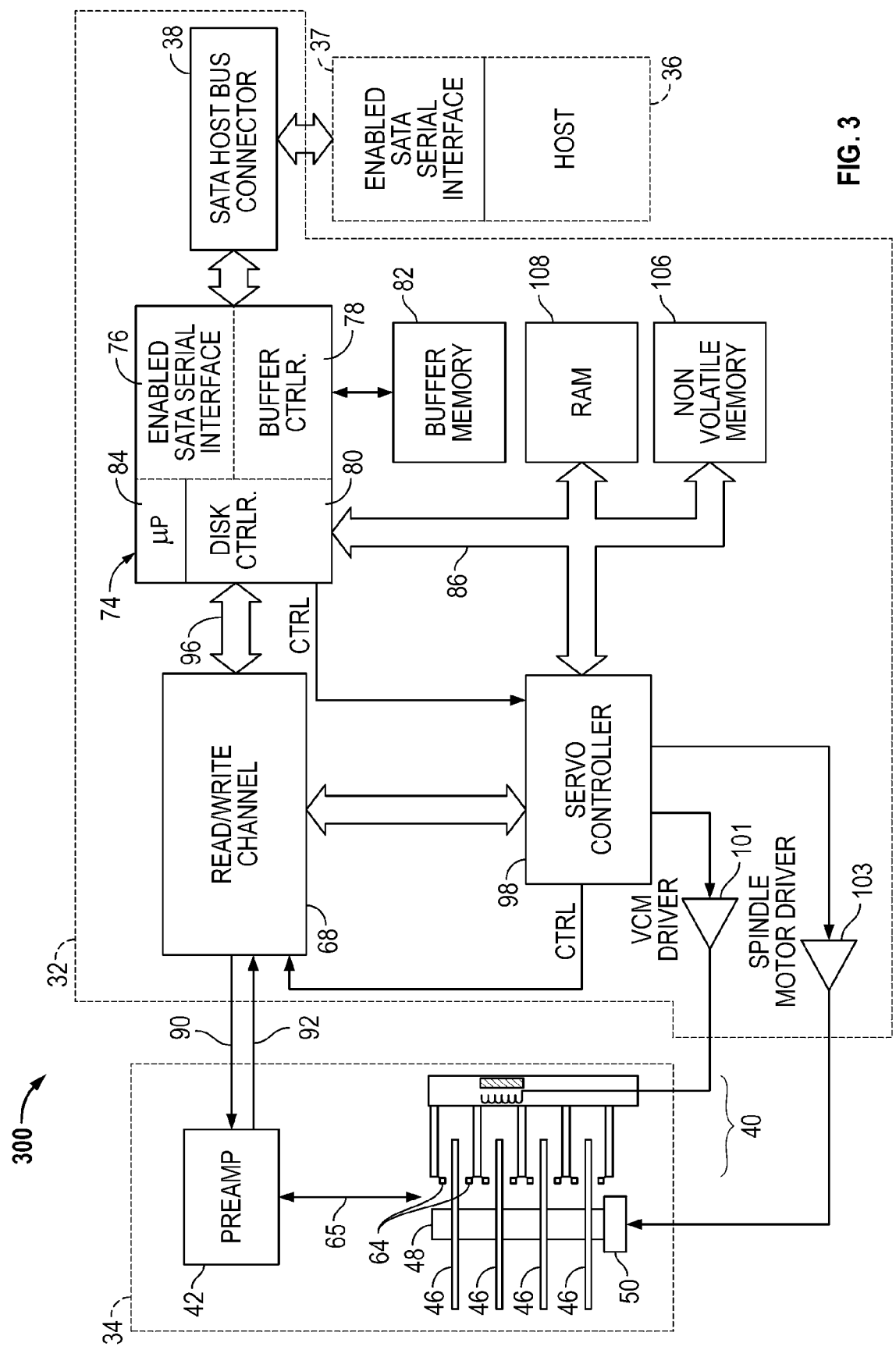
FIG. 3 is a block diagram illustrating a disk drive, such as a hard disk drive.

With reference now to FIG. 3, FIG. 3 is a block diagram illustrating a disk drive, such as a hard disk drive. Hard disk drive 300 may be connected to a host computer 36 over an interconnect. The interconnect may include suitable connectors and cabling to connect disk drive 300 to host 36. In particular, in this example, hard disk drive 300 includes an enabled SATA serial interface 76 connected through a SATA host bus connector 38 to interconnect with a host 36 also having an enabled SATA serial interface 37.

Disk drive 300 comprises a Head/Disk Assembly (HDA) 34 and a controller printed circuit board assembly, PCBA 32. Although a disk drive 300 is provided as an example, it should be appreciated that embodiments of the invention to be hereinafter discussed may be utilized with any suitable device.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface disk controller HIDC 74, voice coil motor driver VCM 102, spindle motor driver SMD 103, and several memory arrays—buffer or cache memory 82, RAM 108, and non-volatile memory 106.

Host initiated operations for reading and writing data in disk drive 300 are executed under control of a microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, read/write channel 68 decodes data into digital bits transferred on an NRZ bus 96 to HIDC 74. During write operations, HIDC provides digital data over the bus to read/write channel 68 which encodes the data prior to its transmittal to preamplifier 42. Preferably, read/write channel 68 employs PRML (partial response maximum likelihood) coding techniques.

HIDC 74 comprises a disk controller 80 for formatting and providing error detection and correction of disk data and other disk drive operations, an enabled SATA serial interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator assembly 40 using a VCM driver 101 and to precisely control the rotation of spindle motor 50 with a spindle motor driver 103.

In one embodiment, disk drive 300 is compatible with a serial interface standard, such as, SATA and/or SAS. The host interface disk controller 74 and other components of the disk drive may be programmed and/or designed to be compatible with such a serial interface standard.

Figure 4:
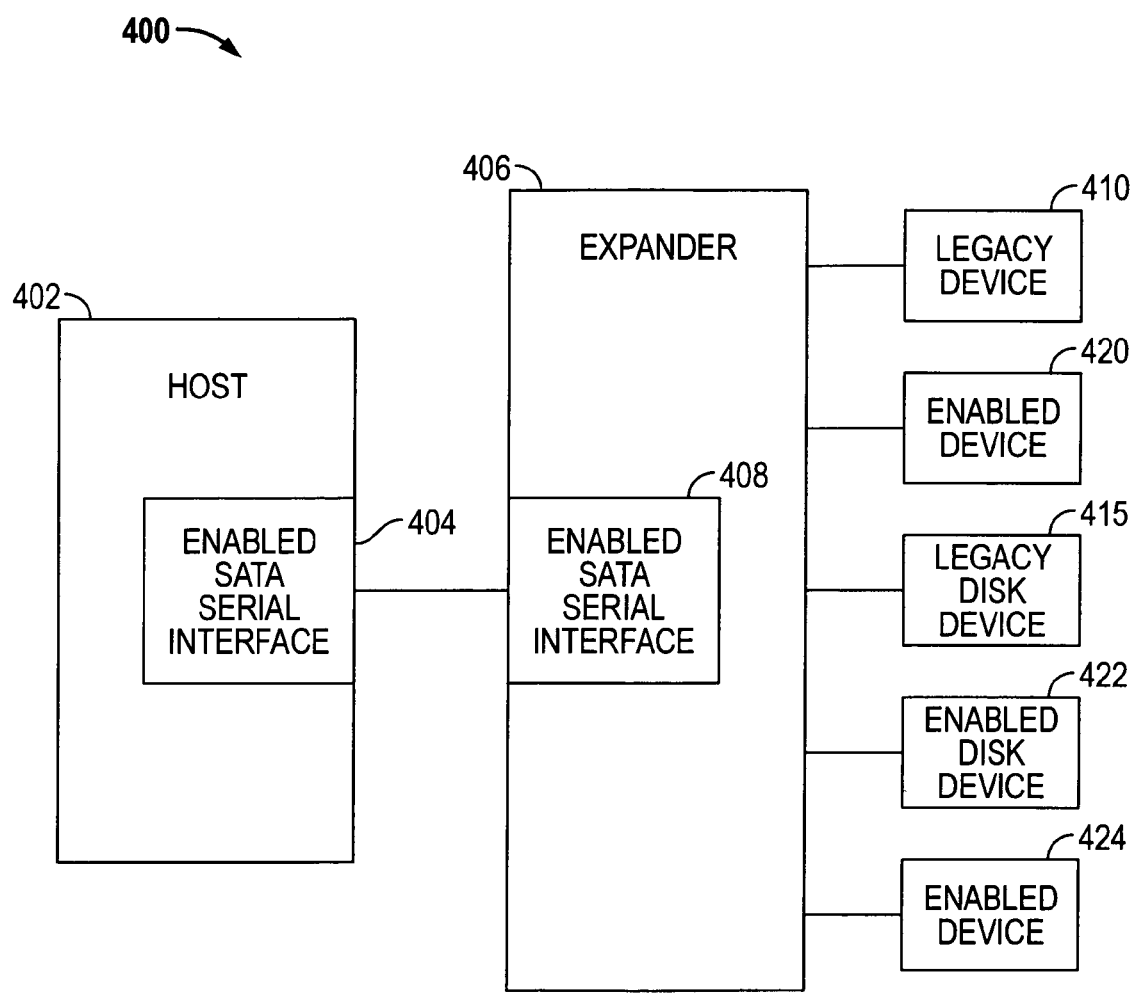
FIG. 4 is a block diagram of an environment in which a host includes an enabled SATA serial interface and is connected through an expander to a plurality of legacy devices and a plurality of enabled devices.

Further, with reference to FIG. 4, a block diagram of another exemplary environment 400 is shown in which a host 402 includes an enabled SATA serial interface 404 connected via a suitable SATA compatible interconnect to an enabled SATA serial interface 408 of an expander 406 such that host 402 can communicate pass-through information to a plurality of legacy devices 410 and 415 that are not pass-through enabled, which ignore pass-through information, as well as a plurality of enabled devices 420, 422, 424 that are pass-through enabled which recognize the pass-through information and can correspondingly transmit pass-through information back to the host 402.

As set forth in the previous exemplary environments of FIGS. 1, 2, 3, and 4, it should be appreciated by those of skill in the art that by using enabled SATA serial interfaces, pass-through information may be inserted during the transmission primitives in a pass-through phase as part of an MIS within or outside of a FIS by a host or device and if the corresponding host or device, respectively, is not pass-through enabled, the receiving host or device will ignore the pass-through information. However, if the receiving host or device is pass-through enabled (e.g. having an enabled SATA serial interface), the receiving host or device will recognize the pass-through information and can utilize it, respectively.

Various embodiments of the invention are described in detail. However, such details are included to facilitate understanding of the invention and to describe exemplary embodiments for employing the invention. Such details should not be used to limit the invention to the particular embodiments described because other variations and embodiments are possible while staying within the scope of the invention. Further, although numerous details are set forth in order to provide a thorough understanding of the embodiments of the invention, it will be apparent to one skilled in the art that these specific details are not required in order to practice the embodiments of the invention.

In other instances, details such as, well-known methods, types of data, protocols, procedures, components, electrical structures and circuits, are not described in detail or shown in block diagram form, in order not to obscure the invention. Furthermore, embodiments of the invention will be described in particular embodiments but may be implemented in hardware, software, firmware, or a combination thereof.

Looking more particularly at the functional aspects of inserting pass-through information within the SATA format, the insertion of pass-through information between the device and the host, and vice-versa, typically occurs at a link layer of the SATA format.

Figure 5:
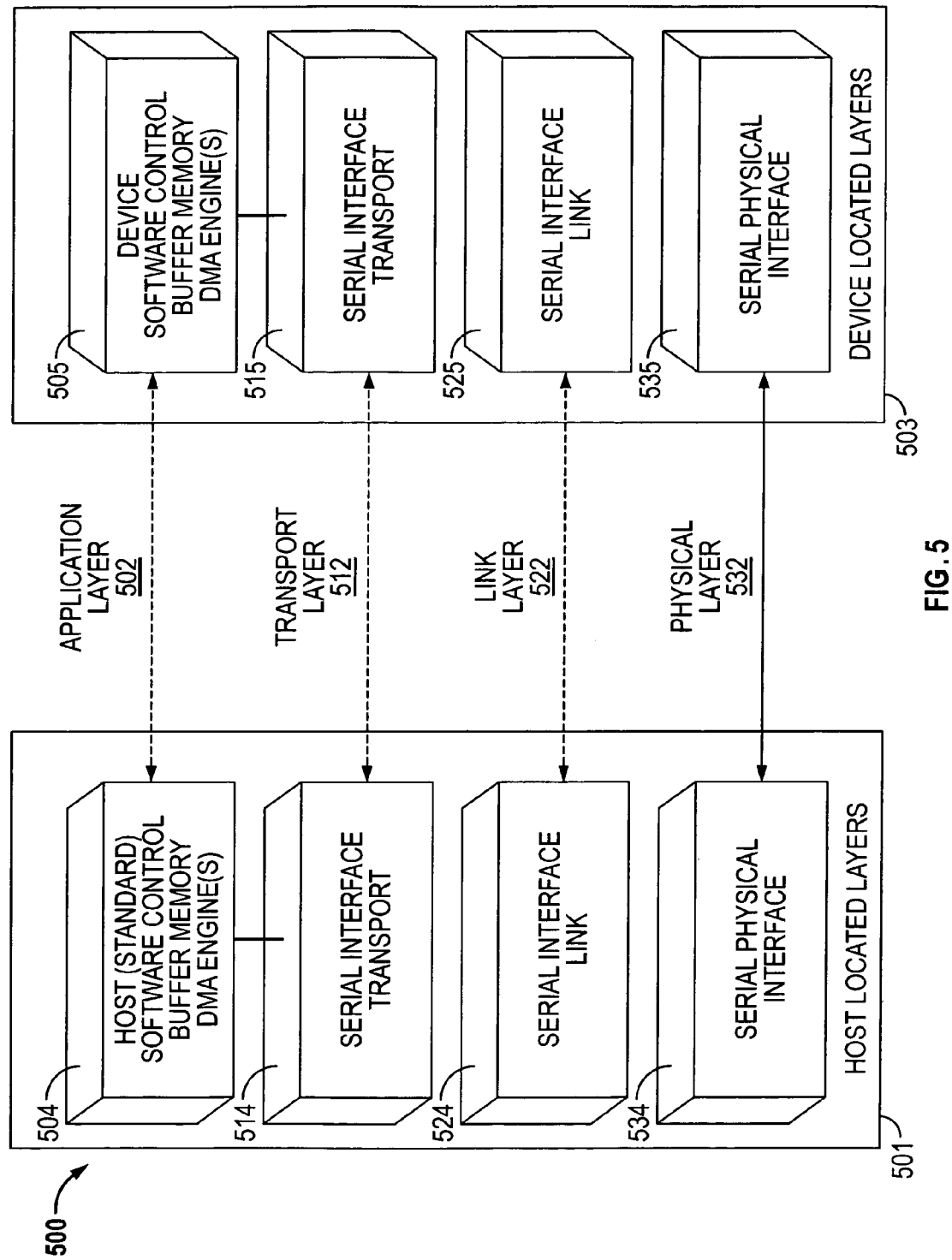
FIG. 5 is a block diagram illustrating the layers associated with the SATA interface format.

Turning now to FIG. 5, FIG. 5 is a block diagram illustrating the layers associated with the SATA interface hierarchy format 500. The SATA interface hierarchy provides a communications path between a host 501 and a device 503. The SATA interface hierarchy is defined as consisting of a set of communications protocol layers including: an application layer 502 between host software control buffer memory DMA engines 504 and device software control buffer memory DMA engines 504; a transport layer 512 between host serial interface transport 514 and device serial interface transport 515; a link layer 522 between host serial interface link 524 and device serial interface link 525; and a physical layer 532 between host serial physical interface 534 and device serial physical interface 535. Embodiments of the invention relate to at least changes in the link layer 522 to allow for the transfer of message information structures (MISs) and pass-through information. Particularly, the insertion of pass-through information between the device and the host, and vice-versa, typically occurs at the link layer 522.

The SATA interface format uses control sequences, called primitives, to indicate the current state or to indicate state transitions. For example, primitives are used to indicate when a frame information structure (FIS) begins and ends. Besides primitives, the SATA format also defines data words that are used to transfer commands, data, and status. Payload data words can only be transferred within a FIS in current SATA interface format. Both primitives and data words are composed of a set of four encoded characters. The SATA interface format uses the well-known 8b-10b encoding method. The four encoded characters of data word consist of four byte values, each of which can represent one of 256 values. The four encoded characters of a primitive consist of one specially encoded control character and three byte values. The control characters are different from any of the 256 data character values. While there are only two control characters defined in the SATA format, and a larger number by the SAS format, a large number of primitives can be defined by varying the control character or the three-byte values that accompany the control character. Collectively, primitives or data words are referred to as DWORDS.

The SATA interface format defines the operation of the link layer 522 through state diagrams and related textual descriptions. Particularly, the link layer 522 on both ends host serial interface link 524 and device serial interface link 525 work together to form a synchronized protocol. Primitives are utilized to accomplish this synchronization.

Transitions in the link layer 522 on one side of the interface are communicated to and cause state transitions in the link layer on the other side. In effect, one side leads and the other side follows (i.e. they are exchanging operation sequences). In some cases, both link layers (e.g. host serial interface link 524 and device serial interface link 525) independently detect an event that causes an internal transition. In these cases, the two sides end up in different unrelated states. The SATA format ensures that the definition of these two states are capable of detecting that the two sides have transitioned to different states and that one side or the other transitions to the appropriate next state.

When the SATA interface is in an operational state (i.e. the host and device are operational and not in a reduced power state), the transmitters in both the host and device continually transmit DWORDs. It is a protocol error not to be continually sending DWORDS unless a reduced power state has been reached. Various link states are defined by the SATA format and the state generally refers to the location of the host or device in a given protocol exchange. For example, a state may be "ready" or "busy" or "waiting for done". The state transactions are defined by the SATA format, and adherence is typically necessary for compatible operation.

In some of the link states, an event on either side of the SATA interface can cause state transitions. For example, it is possible that one part of the SATA interface may have begun the transfer at the same time the other side has detected an event that causes it to change states. The definition of the link layer transmit and receive state machines ensure that, besides the transition, the new state should wait for acknowledgement from the opposite side before proceeding.

In a number of defined states, primitives are sent to indicate the current state of the transmitter and then repeated as "fill" to fulfill the requirement for continuous transmissions. This "fill time" is effectively wasted bandwidth on the SATA interface and prevents the transmission of full-duplex data exchanges. As will be discussed, embodiments of the invention relate to techniques to use these "fill times" to transfer information without affecting the current FIS transfer or disrupting a system that is not enabled. In addition, the ability to extend the fill time for information transfers is easily accomplished.

For example, when a receiver is in a state where it is receiving primitives being used for "fill" and the sender begins sending a MIS, the recipient can detect the non-primitive data and properly receive it. When a transmitter completes the transmission of the MIS, it returns to sending primitives and the receiver can use this as an indication that the MIS transfer is complete.

Embodiments of the invention relate to techniques for identifying the points at which "fill" is occurring and then inserting MISs and pass-through information that will not cause errors to occur in the operation of the SATA interface. Particularly, pass-through information may be transmitted in both directions (host-to-device and device-to-host) simultaneously within the limitations of the SATA interface format in a transparent, compatible manner.

As will be discussed in more detail later, these "fill times" occur in various link states. For example, typically during a "fill time" one side of the SATA interface is sending primitives, as defined by the SATA format, while waiting for an event that would cause the state transition. The receiving side of the SATA interface is receiving the primitives and discarding them. The receiving device is waiting for an event that would cause a state transition. It is during this time that the repeated primitive can be replaced with an MIS and pass-through information. The receive side can detect whether or not the DWORD being received is an MIS, and can accept the DWORD as pass-through information being transferred.

As an example, when the host 501 is waiting for a device 503 to provide completion status for a completed operation, instead of wasting bandwidth, an MIS can be sent. For example, in the disk drive embodiment of FIG. 3, a disk drive may take hundreds of microseconds to acknowledge an operation on the interface while it parses the information, handles other priority operations, or other delays. During this time, a host will send a WTRM (wait for termination) primitive as a filler on the bus, and the device will be sending R_IP (receive in process). In this example, both the host and the device are in a required protocol lock-up and nothing else can be done on the channel. According to aspects of the present invention, MISs and pass-through information can be transferred across the bus in both directions during this otherwise wasted bandwidth.

Figure 6:
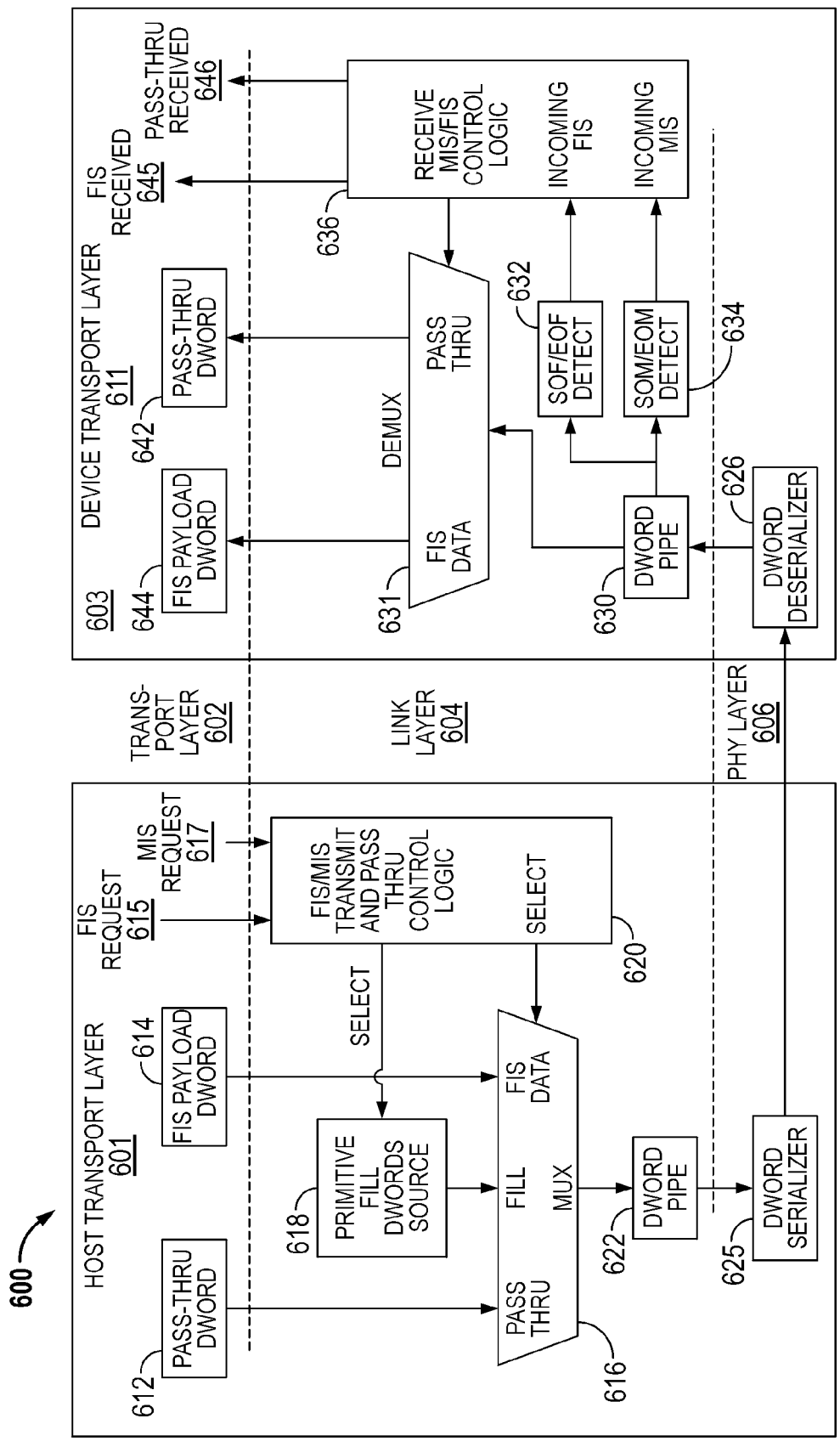

Turning now to FIG. 6, FIG. 6 is a block diagram illustrating an example of functionality to implement the insertion of pass-through information as well as the recognition and receipt of pass-through information by host transmitting and device receiving enabled SATA serial interfaces, respectively. The system 600 may be divided into transactions that occur at the transport layer 602, the link layer 604, and the physical layer 606. At the host transmit side at the host transport layer 601, the host receives a FIS payload DWORD transmit stream from the host transport layer 601 (the source and the destination for the FIS) at buffer 614, and passes this FIS payload DWORD data to the FIS data port of multiplexer 616. Primitive fill DWORDs may be supplied by primitive fill source 618 and inputted into the fill port of the multiplexer 616. The selection of FIS payload DWORDs and primitive fill words may be controlled by the transmit control logic 620. The transmission of FIS data may be based upon an FIS request 615 from the host transport layer 601. DWORD data may be routed through DWORD pipe 622 and through DWORD serializer 625.

On the receive side (e.g. the device in this example), the device accepts the data stream at physical layer 606. DWORD deserializer 626 accepts the deserialized DWORD and transmits the deserialized DWORD onto DWORD pipe 630. A start of frame/end of frame (SOF/EOF) detection circuit 632 may be coupled to receive control logic 606 to control multiplexer 631 for the reception of FIS data.

In addition to the previously-described standard functionality enabled by the SATA format, embodiments of the invention further include additional functionality to support the addition of pass-through information that is recognized by pass-through enabled devices and/or hosts. Particularly, a transmit data path from the host transport layer 601 for pass-through information to be sent to the link layer 604 is included. Particularly, as shown in the host transport layer 601, pass-through DWORD information from buffer 612 may be transmitted to the link layer 604 into a pass-through port of multiplexer 616. Multiplexer 616 allows for the selection and insertion of the pass-through information as part of an MIS based upon an MIS request 617 and under the control of transmit control logic 620. Particularly, message request 617 may be a signal to the transmit control logic 620 from the host transport layer 601 to indicate a transmission of a MIS.

Through DWORD pipe 622 of the link layer 604 and through DWORD serializer 625 of the physical layer 606, either standard SATA DWORD messages may be sent, fill data may be sent, or pass-through information as part of an MIS may be sent. Particularly, the pass-through MISs may be sent to a device that when enabled recognizes the pass-through information, and when not enabled merely discards it. The inserted pass-through information that is sent as part of a MIS during the transmission of primitives (e.g. repeated primitives) in a pass-through phase. The MIS may include a start of message (SOM) primitive sequence to indicate a beginning of the pass-through information to be transmitted and an end of message (EOM) primitive sequence to indicate that the pass-through information has been transmitted.

On the receiver side (e.g. in this example the device side), a receive data path that extracts the pass-through information from the data stream and that detects the MIS and the pass-through information is utilized. Particularly, based upon information received from DWORD pipe 630 a SOM from a MIS via SOM/EOM detection circuit 634 signals the receive control logic 636 that an MIS with pass-through information is being transmitted. SOM/EOM detection circuit 634 also detects an end of message an EOM of the MIS. Based upon SOM and EOM detection by SOM/EOM detection circuit 634 the receive control logic controls multiplexer 631 such that pass-through information is transmitted to pass-through DWORD buffer 642 of the device transport layer such that the pass-through information may be utilized by the device.

Alternatively, when normal DWORD data from DWORD pipe 630 (i.e. non-pass-through information) is transmitted through multiplexer 631 as controlled by receive control logic 636, this DWORD information is simply transmitted as standard SATA format FIS payload DWORDs to FIS payload DWORD buffer 645 of the device transport layer 611. Transmit control logic 636 may also include a pass-through received signal 646 to indicate that the MIS transmission and that the information pass-through has been successfully received, as well as, an FIS received signal 644 to indicate that FIS data has been successfully received.

It should be appreciated that these MIS exchanges allow for full duplex operation because the host and the device may initiate and complete MIS transfers simultaneously. Thus, information may be advantageously transferred in the opposite direction simultaneously in normal SATA transfers. It should be appreciated that although FIG. 6 illustrates a functionality of an enabled SATA serial interface at the host side to send pass-through information to the device side that the same functionality in terms of hardware, software, and/or firmware is also present in the enabled SATA serial interfaces to enable device side to host side transmissions of pass-through information and MISs.

Also, it should be appreciated that transmission of the pass-through information between the device or the host, may occur in a simplex mode, a half duplex mode, or a full duplex mode.

The pass-through information may include at least one of a message, data, status, or a command. Further, as previously discussed, the inserting of pass through information between the device and the host occurs at the link layer. In one embodiment, the primitives may be repeated primitives. Additionally, in some embodiments, the primitives may include primitives that are shared primitives common to both the device and the host.

In one embodiment, the message information structure (MIS) and the pass-through information may be transmitted during an idle (SYNC) phase. Additionally, the MIS and the pass-through information may be transmitted during at least one of a transmit ready (X_RDY) phase, a wait for termination (WTRM) phase, a receipt in progress (R_IP) phase, a receipt OK (R_OK) phase, or a receive with error (R_ERR) phase.

Figure 7:
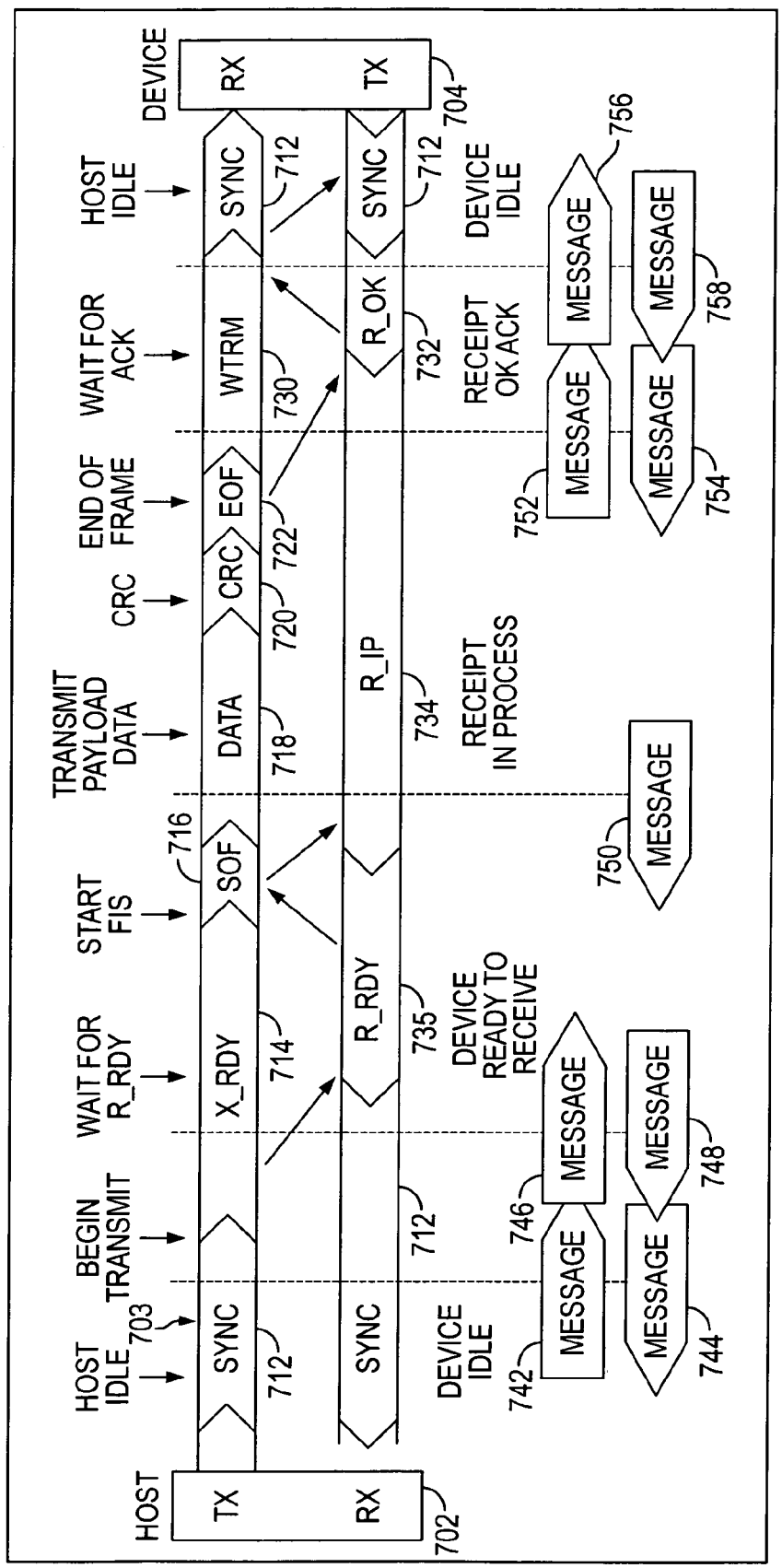
FIG. 7 is a diagram illustrating a typical FIS transfer and particularly illustrates locations at which pass-through information may be transmitted.

With reference to FIG. 7, a diagram is shown that illustrates a typical FIS transfer and particularly illustrates locations at which pass-through information may be sent. This may be accomplished with the structure and functionality previously-described with reference to FIGS. 1-6.

First, a typical FIS transfer from a host 702 to a device 704 is illustrated to help in the explanation. To begin with, the host 702 and the device 704 start in an idle state by transmitting idle signals (SYNC) 712. The host 702 begins the transfer of information by sending X_RDY (transmit ready) 714 and waits for the device 704 to indicate the device's readiness to receive a frame information structure (FIS). The device 704 indicates that it is ready to receive a FIS by returning R_RDY (receive ready) 735.

The host 702 having received the device's readiness begins a frame of information with a SOF (start of frame) primitive 716. The host 702 follows the SOF 716 with payload data 718 to be transferred. In turn, the device 704 responds to the receipt of data with a R_IP (receipt in process) 734.

After the payload transfer is complete, the host 702 sends CRC checksum character 720 followed immediately by an EOF (end of frame) primitive 722.

The host 702 transmits WTRM (wait for termination) 730, and waits for the device 704 to acknowledge the FIS. The device 704 recognizes the EOF character 722, and if the CRC checksum 720 was correct, acknowledges receipt with R_OK (receipt OK) 732.

The host 702, upon receiving the devices R_OK acknowledgement 732, returns to the idle state (SYNC) 712. The device 704 determining that the host has accepted its R_OK also returns to the idle state (SYNC) 712.

With the FIS transmission example previously described, there are various points during this process at which MISs and pass-through information may be sent. These opportunities will be noted and indicated as follows. Particularly, pointers are provided to indicate when MISs according to aspects of the invention can be transmitted. At each of these times, either the host 702, the device 704, or both the host and the device are transmitting otherwise discarded fill characters. The direction of the pointer indicates the direction in which information can be transparently transmitted between the host 702 and the device 704.

For example, as indicated by message blocks 742 and 744, prior to FIS transmission, the bus is idle and both the host and the device are transmitting SYNC primitives 712. During this time, the host 702 and/or the device 704 may transmit MISs and pass-through information.

At message block 746, the host 702 may transmit a host-to-device MIS and pass-through information during X_RDY 714. At message block 748, the device 704 may transmit a device-to-host MIS and pass through information during SYNC 712.

At message block 750, the device may transmit a MIS and pass-through information while the host is transmitting payload data 718.

At message block 752 the host 702 may transmit a host-to-device MIS and pass-through information during the device's receipt in process 734. At message block 754, the device may transmit a device-to-host MIS and pass-through information during the wait for acknowledgement (WTRM) phase of the host.

At message block 756, the host 702 may transmit a host-to-device MIS and pass-through information during a wait for termination (WTRM) phase. At message block 758, the device 704 may transmit a device-to-host MIS and pass-through information during a R_OK sequence.

As can be seen from the previous examples of FIG. 7, a simultaneous message may be transmitted between the host and the device and the vice-versa, allowing for full duplex operation.

As will be discussed hereinafter with reference to FIGS. 8-15, various additions to the SATA interface format will be discussed to enable the previously-discussed types of pass-through information transfers and serial communications between a device and a host. It should be appreciated that these additions to the SATA format to add MISs and pass-through information that are recognized by enabled devices and hosts and that ignored by non-enabled devices and hosts, as previously discussed, are only exemplary, and that many other implementations may be possible. For ease of reference, additional messages and states that have been added to the standard SATA format are in solid lines in the drawings and preexisting SATA messages and states are indicated in dashed lines. Only brief descriptions are given to the following example messages and states as the implementations should be apparent to one of skill in the art and because many possible different types of messages and permutations are possible.

With reference to FIG. 8, FIG. 8 is a table listing a variety of different state transitions that are tabulated with MIS bus states and message primitives, above and beyond what is utilized in the standard SATA format. It should be appreciated that a message primitive is either a sequence of data characters that is recognized as a message header by an enabled device or host, or a new primitive sequence that does not duplicate an already defined SATA primitive. Particularly, it should be noted that in FIG. 8, six additional states of transmitting and receiving messages (MISs), respectively, are defined: LMT1; LMT2; LMT3; LMR1, LMR2; and LMR3; that may be utilized to implement the examples of FIG. 7.

Figure 9:
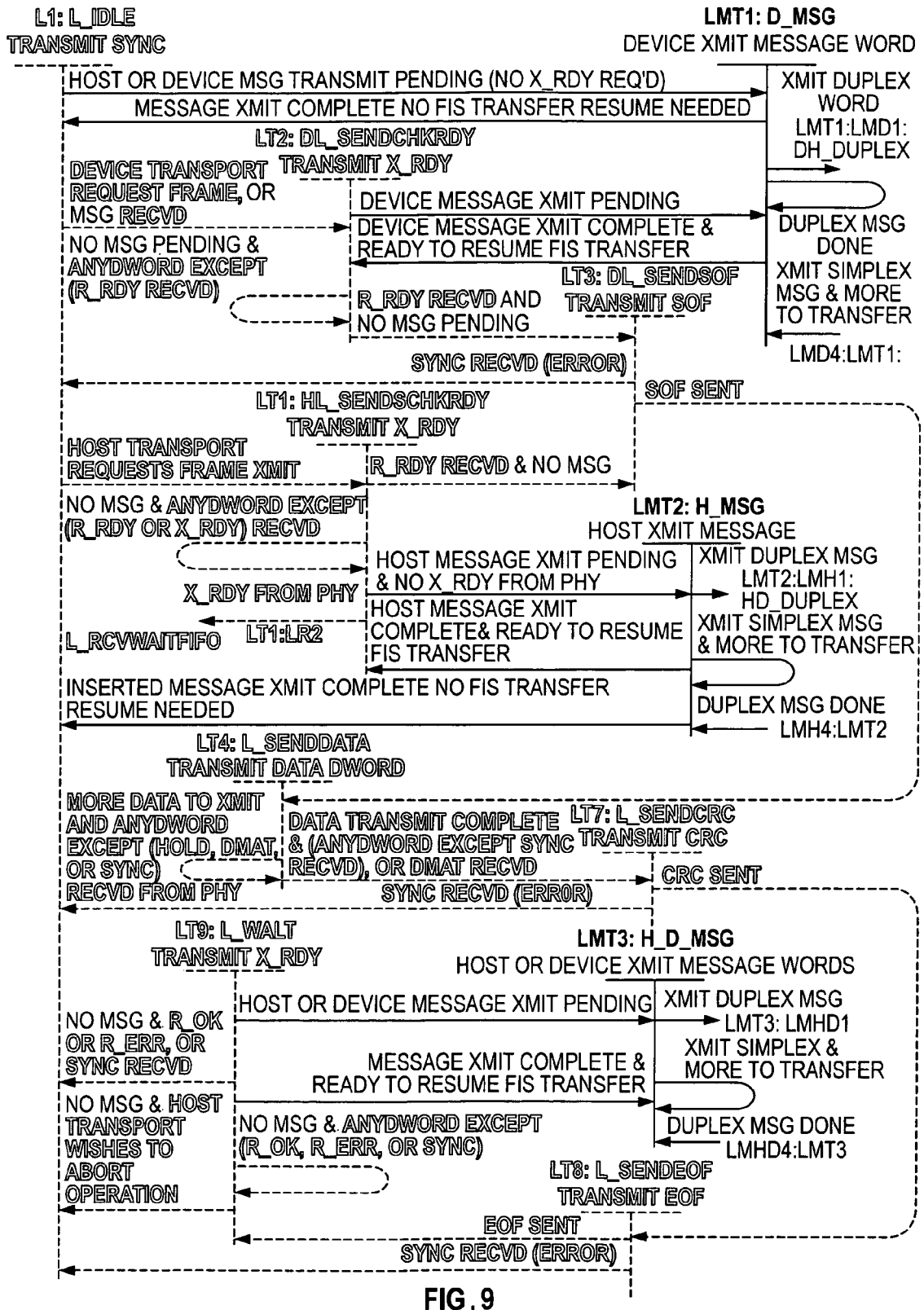
FIG. 9 is a link state diagram that illustrates added states for transmitting messages.

Turning to FIG. 9, FIG. 9 is a link state diagram that illustrates the added states for transmitting messages (MISs): LMT1, LMT2, LMT3; that enable the previously-discussed examples of FIGS. 7 and 8.

Figure 10:
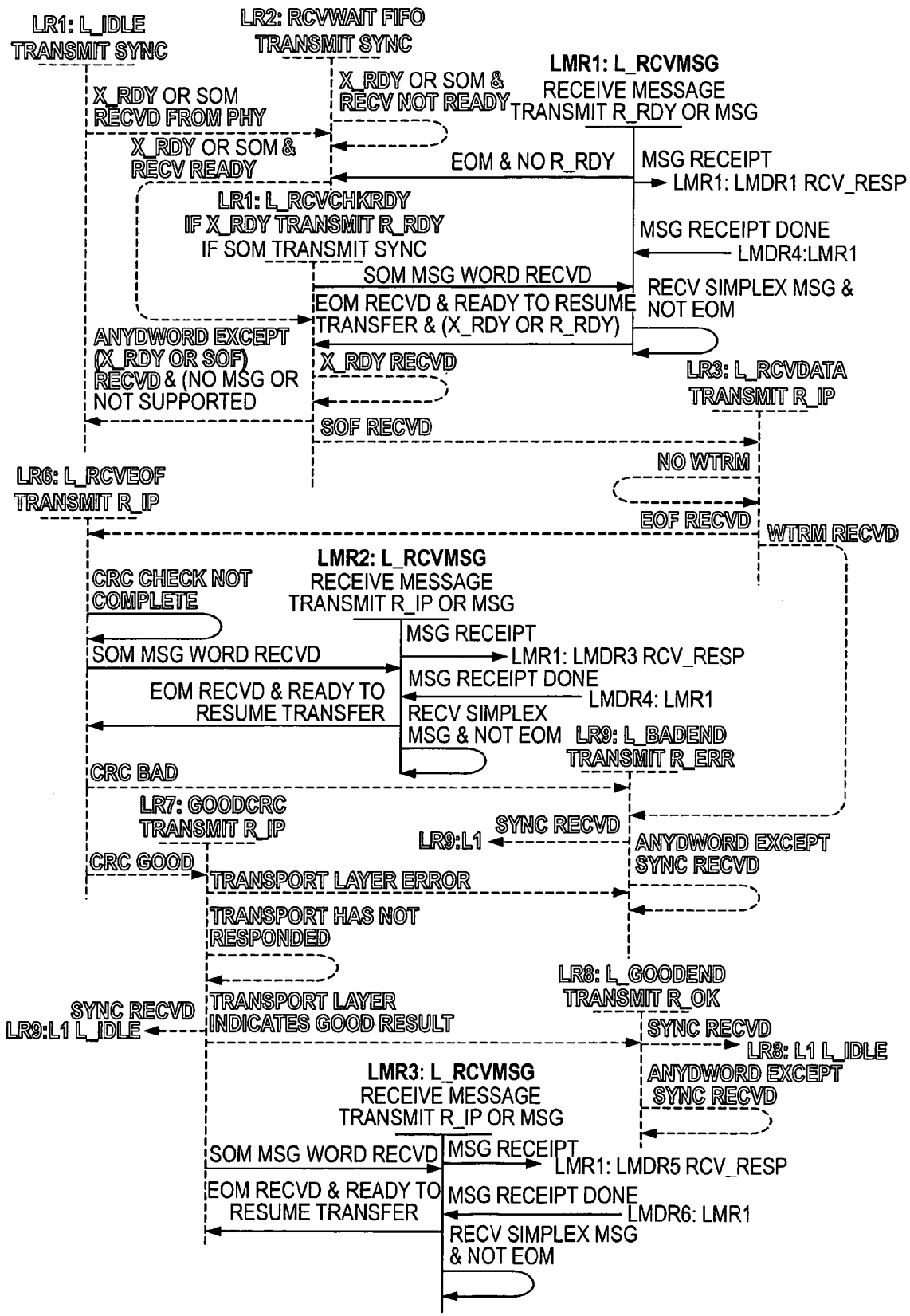
FIG. 10 is link state diagram that illustrates added states for received messages.

Further, with reference to FIG. 10, FIG. 10 illustrates link receive state diagrams describing added states for the reception of MISs (particularly LMR1, LMR2, and LMR3) that implement the previously-described examples of FIGS. 7 and 8.

It should be noted in the state diagrams of FIGS. 9 and 10 that legacy operations are executed in the same manner as in the standard SATA interface format and added states that are not called; however, the state diagrams of FIGS. 9 and 10 also enable the transfer of MISs as shown in the previously-described example of FIG. 7.

It should be noted that in the previous example, the MISs have simply been transmitted as pass-through information without acknowledgement. However, techniques according to the present invention also allow for the ability to have exchanges between a host and device with acknowledgement. One example of such an exchange would be for the recipient of an MIS to acknowledge receipt of the MIS (e.g. message received OK). This type of operation requires a handshake response and is a type of half-duplex communication. Another example would be to await an indication that a requested operation was completed.

In order to accomplish these half-duplex (handshake) transfers, additional states may be added to determine if the message is simplex (e.g. send message, no response needed), or half-duplex with a return message needed. The determination of whether a message is simplex or half-duplex may be accomplished by the use of headers in the message primitives defined for that purpose.

An example of this may be seen with reference to FIG. 11, in which FIG. 11 is a table illustrating examples of half-duplex messages. In this table, a message (MIS) from the host to the device is transmitted and then subsequently a MIS from the device to the host is shown. In order to accomplish this message exchange, additional states are added to both the host and the device to wait for the response, rather then returning to FIS operation.

Figure 12:
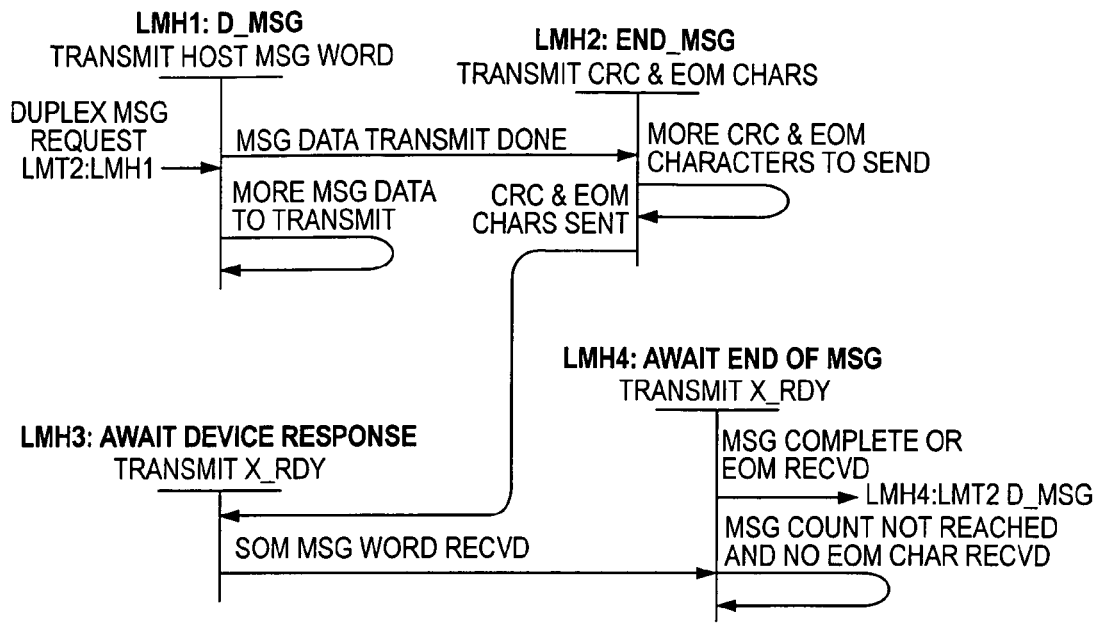
FIG. 12 is a link state diagram for half-duplex messages.

In this example, the state machine recognizes that the message requires a response, and rather than returning, moves to state LMH3 to prepare to receive a duplex message, and subsequently moves to state LMH4, as shown in FIG. 12, which demonstrates message transmit and message response and return to LMT2.

Figure 13:
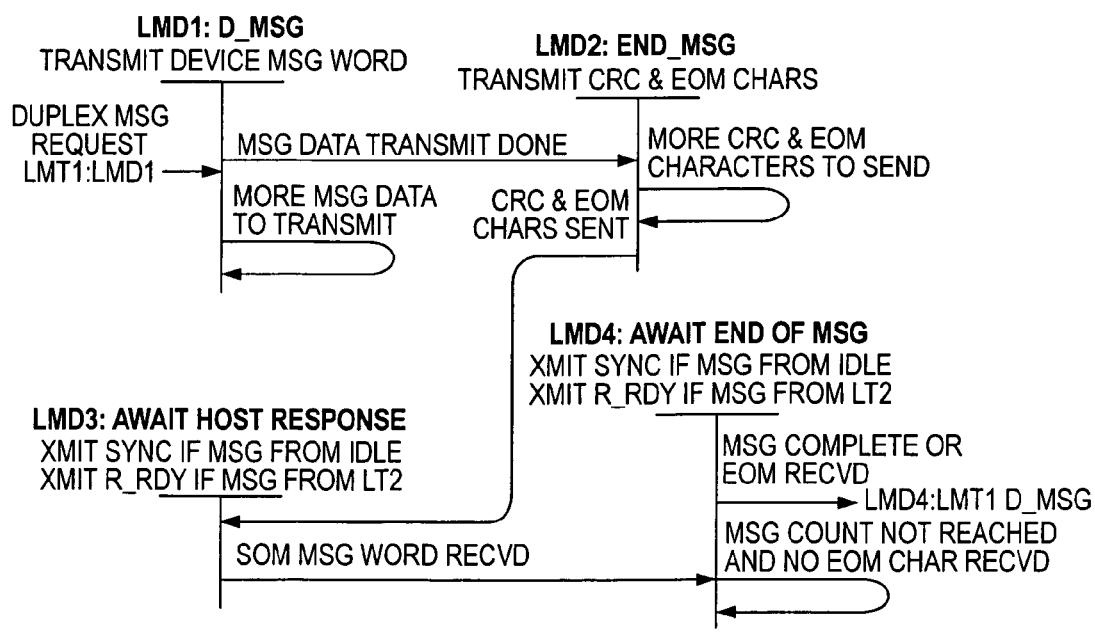
FIG. 13 is a link state diagram to handle handshake exchanges for messages.
Figure 14:
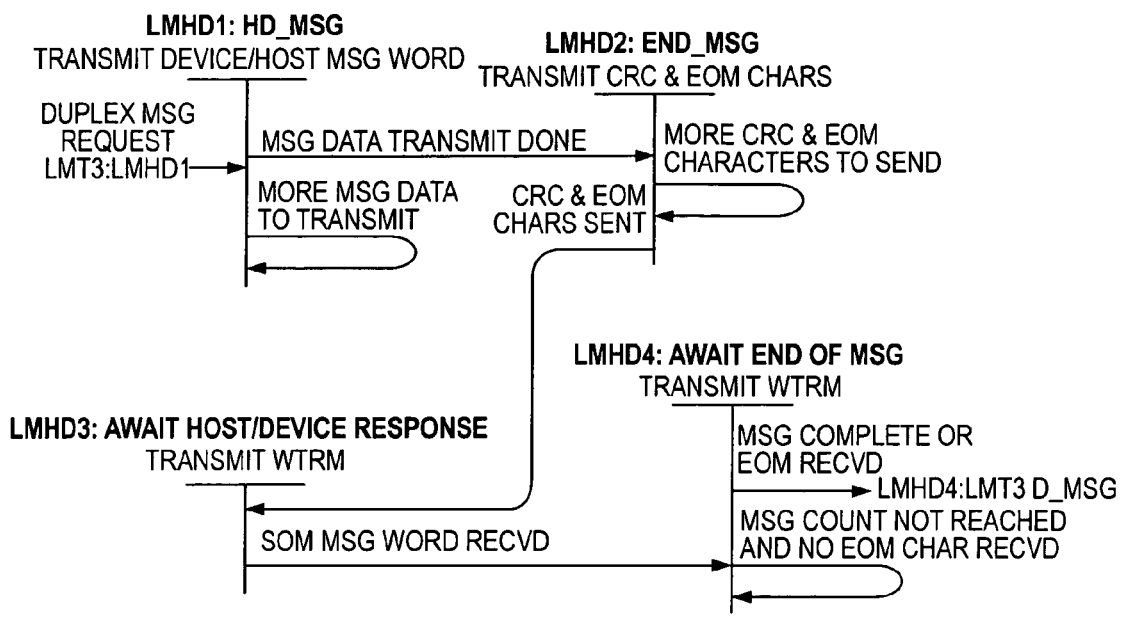
FIG. 14 is a link state diagram that illustrates added states for the reception of messages.

Further, FIGS. 13 and 14 are state diagrams to handle handshake exchanges for messages when messages are sent during the device L1 state or device LT9 state. In FIGS. 13 and 14, the device sends a message header and data words in state LMD1, and if needed, includes message CRC and state LMD2. Also, in LMD2, the host includes an end of message (EOM) character or primitive if needed. However, this may not be needed if the message header includes a message word count. After the transmit message, instead of returning to the FIS transaction as in a simplex message, the device transitions to state LMD3 to await a response from the host. When the host responds with a SOM character, the host transitions to state LMD4, and receives the message. When the message is completed, either by message count or by a EOM character being received, the host returns to state LMT2, and from there, back to state LT1, where it came from. Similarly, if the message originated from state L1, the return would be to state L1. FIG. 14 operates in the same way as describes for FIG. 13, but originates from and returns to transmit state LT9, and is applicable for both host and device transmission of messages.

In order to receive messages, as previously discussed, the link receive state machine is modified as shown in FIG. 10. In this diagram, it can be seen that messages from the example of FIG. 11 are detected in state LR1 are recognized requiring an exchange response in state LMR1, and then transitioning to state LMDR1 as shown in FIG. 15.

Figure 15:
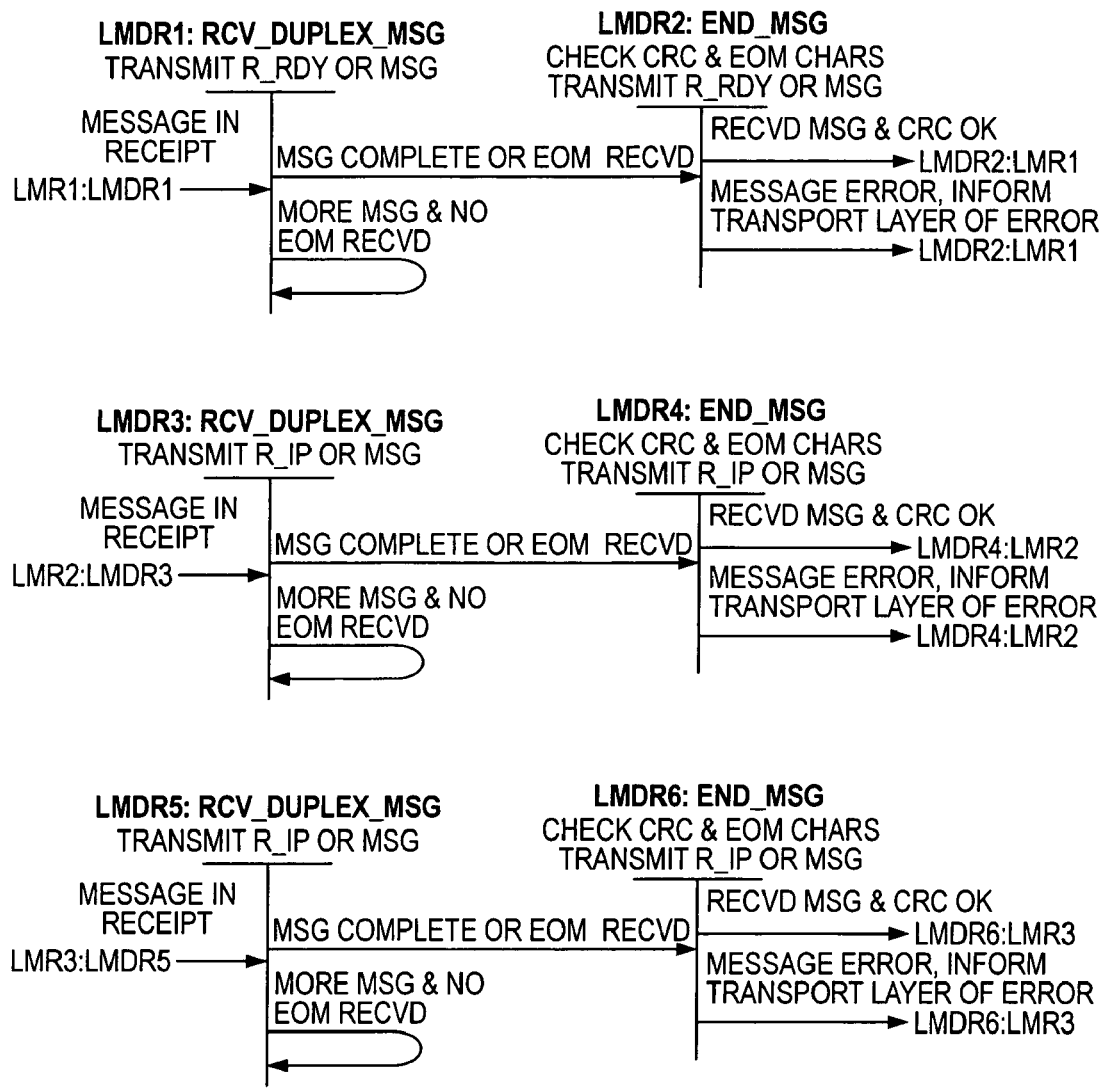
FIG. 15 is another link state diagram for received messages.

In state LMDR1 of FIG. 15, the message data words are received, and then a transition to state LMDR2 is made to receive the CRC and EOM characters in the similar manner as previously-described. After the EOM is received, a return is made to state LMR1 and from there back to the originating state (LR1, or LR2) and if necessary, back to idle in state L1.

Similar exchanges are shown if the message originates in state LR6 of FIG. 14, going to state LMR2 and then to state LMDR2, and then to LMDR3 in FIG. 15 and returning; and also from state LR7 of FIG. 10 to state LMR3 and then to state LMDR5 and then to LMDR6 in FIG. 15 and returning.

From the above example of the MIS exchange between a host and a device, it can be seen that similar exchanges are possible from the various other message opportunities already defined. MIS exchanges can be made from the host state LT9, for example and then the link message state machine in FIG. 10 would be called, and a similar return to state LT9 upon completion of the message.

The examples given explain the state diagram, and illustrate multiple combinations of MIS exchanges that can occur. It should be recognized that MISs may be exchanged while FIS exchanges are in process, and the FIS exchanges will operate normally.

Transactions can also occur simultaneously. In other words, host-to-device MISs may be transmitted at the same time as device-to-host MISs are being received. This type of operation is called full-duplex operation.

An example of this is given in FIG. 16. In this example, messages from the host are transmitted in the same manner as the simplex method described earlier. However, in this example, rather then the device staying idle and transmitting fill characters on its transmitter, it also begins to send a message. In this example, there are simultaneously host-to-device message states, and device-to-host message states.

No additional states beyond those already described are required for this full-duplex operation. The operation is implemented by the host or device according to MIS type (as defined by a message header or message primitive or by context of the messages itself), to send transactions in simplex (send without acknowledgement) or half-duplex (handshake) or full-duplex (simultaneously) operation.

According to the previously-described examples, MIS and pass-through information transfers may be initiated any time the link state machine is in any one of the following states:
L1:L_IDLE
LT1:HL_SendChkRdy
LT2:DL_SendChkRdy
LT9:L_Wait
LR1:L_RcvChkRdy
LR6:L_RcvEOF
LR7:GoodCRC Some examples of conditions when Fill time messages may be transferred are presented below:
The host can transmit messages when:
Host is in state LT1 Device is in state LT2
Host is in state LT9 Device is in state LR7
The Device can transmit messages when:
Host is in state LR1 and Device is in state LT2
Host is in state LR7 Device is in state LT9

These examples allow for messages (MISs) in two ways: host-to-device and device-to-host. These transfers may occur either outside of regular FIS transfers (by starting X_RDY and when message completed, returning to L1_IDLE) or inside regular FIS transfers before or after FIS data words (before an X_RDY. LT1 for host or LT2 for device) with a continuation of the FIS, or at LT9 (after FIS data words at WTRM, for either host or device) which must continue FIS transfer.

Further, message phases can honor flow control HOLD/HOLDA in exactly the same was as FIS transfers. These actions will be ignored by legacy devices.

Three methods of fill-time messaging may be utilized: simplex, half duplex, and full duplex. In simplex, the message is simply sent without acknowledgement from the recipient. In simplex, there is no flow control. In half-duplex, the sender may wait for an acknowledgement (e.g. a Message Primitive: an identifiable character stream or primitive). The message may also have a Header wherein a header may be a string of characters of known length or embedded length count that contains message information such as length, content, etc. In half-duplex, flow control may be performed using HOLD/HOLDA, or an equivalent pair of flow control identifiers or primitives that may be defined for message flow control.

It should be appreciated by those of skill in this art that, although examples of the invention have previously been described with reference to the SATA and/or SAS protocol and format, and particular additional messages and state diagrams have been given as examples of additions to the SATA format, that embodiments of the invention may be utilized with any serial interface format.

The invention claimed is:

1. A device communicatively coupled to a host in a Serial Advanced Technology Attachment (SATA) format, the device comprising:

a processor to control operations in the device; and a serial interface to control serial communication in accordance with the SATA format with the host, including:

entering into a first state in response to a first primitive from the host;

transmitting a second primitive to the host to indicate the first state;

transmitting at least one fill character to the host, wherein the fill character continues to indicate the first state;

after determining to transmit more fill characters, replacing at least one fill character with pass-through information prior to receiving a third primitive from the host, wherein the third primitive indicates a state chance;

transmitting the pass-through information to the host;

receiving the third primitive from the host;

entering into a second state in response to the third primitive; and transmitting a fourth primitive to the host to indicate the second state.

2. The device of claim 1, wherein the fill characters include repeated primitives.

3. The device of claim 1, wherein the first, second, third, and fourth primitives are shared primitives common to both the device and the host.

4. The device of claim 1, wherein the pass-through information includes at least one of message, data, status, or a command.

5. The device of claim 1, wherein the transmission of the pass-through information between the device and the host occurs at a link layer.

6. The device of claim 1, wherein the first state includes an idle (SYNC) phase.

7. The device of claim 1, wherein the first state includes at least one of a transmit ready (X_RDY) phase, a wait for termination (WTRM) phase, a receipt in progress (R_IP) phase, a receipt OK (R_OK) phase, or a received with error (R_ERR) phase.

8. The device of claim 1, wherein the transmission of the pass-through information between the device and the host occurs in a simplex mode.

9. The device of claim 1, wherein the transmission of the pass-through information between the device and the host occurs in a half-duplex mode.

10. The device of claim 1, wherein the transmission of pass-through information between the device and the host occurs in a full duplex mode.

11. A host communicatively coupled to a device in a Serial Advanced Technology Attachment (SATA) format, the host comprising:

a processor to control operations in the host; and a serial interface to control serial communication in accordance with the SATA format with the device, including:

entering into a first state in response to a first primitive from the device;

transmitting a second primitive to the device to indicate the first state;

transmitting at least one fill character to the device, wherein the fill character continues to indicate the first state;

after determining to transmit more fill characters replacing at least one fill character with pass-through information prior to receiving a third primitive from the device, wherein the third primitive indicates a state chance;

transmitting the pass-through information to the device;

receiving the third primitive from the device;

entering into a second state in response to the third primitive; and transmitting a fourth primitive to the device to indicate the second state.

12. The host of claim 11, wherein the fill characters include repeated primitives.

13. The host of claim 11, wherein the first, second, third, and fourth primitives are shared primitives common to both the host and the device.

14. The host of claim 11, wherein the pass-through information includes at least one of message, data, status, and a command.

15. The host of claim 11, wherein the transmission of the pass-through information between the host and the device occurs at a link layer.

16. The host of claim 11, wherein the first state includes an idle (SYNC) phase.

17. The device of claim 1, wherein the device is a disk drive.

18. The host of claim 11, wherein the device is a disk drive.

19. The device of claim 1, wherein the host is one of pass-through enabled or not pass-through enabled, and if the host is not pass-through enabled, the host ignores the pass-through information, whereas if the host is pass-through enabled, the host recognize the pass-through information.

20. The host of claim 11, wherein the device is one of pass-through enabled or not pass-through enabled, and if the device is not pass-through enabled, the device ignores the pass-through information, whereas if the device is pass-through enabled, the device recognize the pass-through information.

21. A method for a device to communicate with a host in a Serial Advanced Technology Attachment (SATA) format, the method comprising:

entering into a first state in response to a first primitive from the host;

transmitting a second primitive to the host to indicate the first state;

transmitting at least one fill character to the host, wherein the fill character continues to indicate the first state;

after determining to transmit more fill characters, replacing at least one fill character with pass-through information prior to receiving a third primitive from the host, wherein the third primitive indicates a state change, transmitting the pass-through information to the host;

receiving the third primitive from the host;

entering into a second state in response to the third primitive; and transmitting a fourth primitive to the host to indicate the second state.

22. The method of claim 21, wherein the fill character is the same as the first primitive.

23. The method of claim 21, wherein the fill characters include repeated primitives.

24. The method of claim 21, wherein the first state includes an idle (SYNC) phase.

25. The method of claim 21, further comprising, after transmitting the pass-through information, transmitting more fill characters to the host prior to receiving the third primitive from the host.

* * * * *

UNITED STATES PATENT AND TRADEMARK OFFICE
CERTIFICATE OF CORRECTION

PATENT NO. : 7,673,075 B1  Page 1 of 1
APPLICATION NO. : 11/131036
DATED : March 2, 2010
INVENTOR(S) : John C. Masiewicz It is certified that error appears in the above-identified patent and that said Letters Patent is hereby corrected as shown below:

In the Claims:

Col. 15, Line 13, Claim 1: Delete "chance" and insert --change--.

Col. 15, Line 63, Claim 11: Delete "chance" and insert --change--.

Signed and Sealed this

Fourteenth Day of September, 2010

David J. Kappos
*Director of the United States Patent and Trademark Office*